April 14, 1964 E. A. BROOKS ETAL 3,128,990
SELF-ALIGNING CONNECTOR FOR STUD TENSIONERS
Filed May 8, 1961 3 Sheets-Sheet 1

INVENTORS.
Ernest A. Brooks
Le Roy S. DeMart
BY
Harness, Dickey & Pierce,
ATTORNEYS.

April 14, 1964  E. A. BROOKS ETAL  3,128,990
SELF-ALIGNING CONNECTOR FOR STUD TENSIONERS
Filed May 8, 1961  3 Sheets-Sheet 2
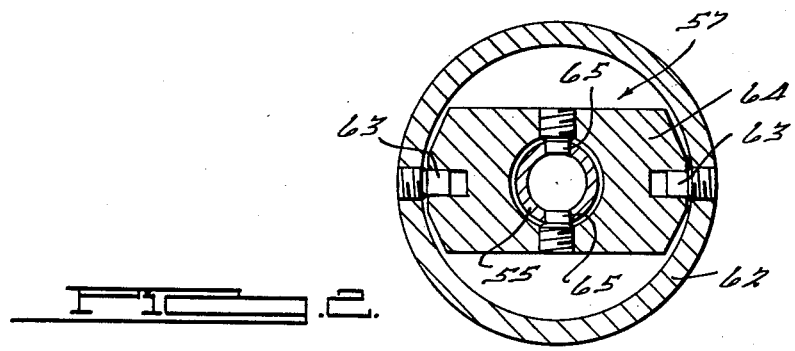
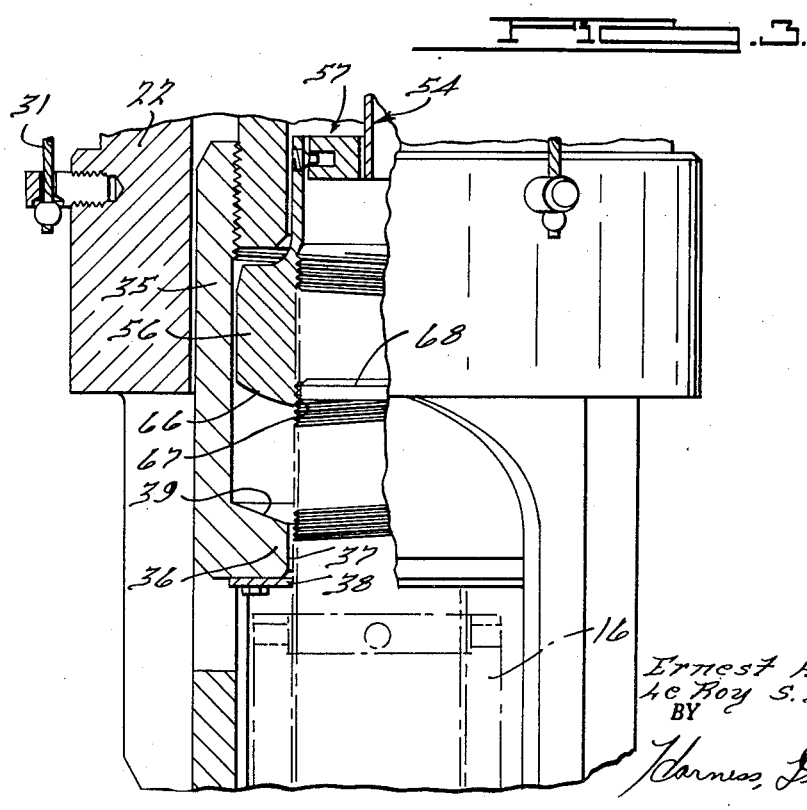
INVENTORS.
Ernest A. Brooks
Roy S. DeHart
BY
Harness, Dickey & Pierce
ATTORNEYS.

April 14, 1964     E. A. BROOKS ETAL     3,128,990
SELF-ALIGNING CONNECTOR FOR STUD TENSIONERS
Filed May 8, 1961
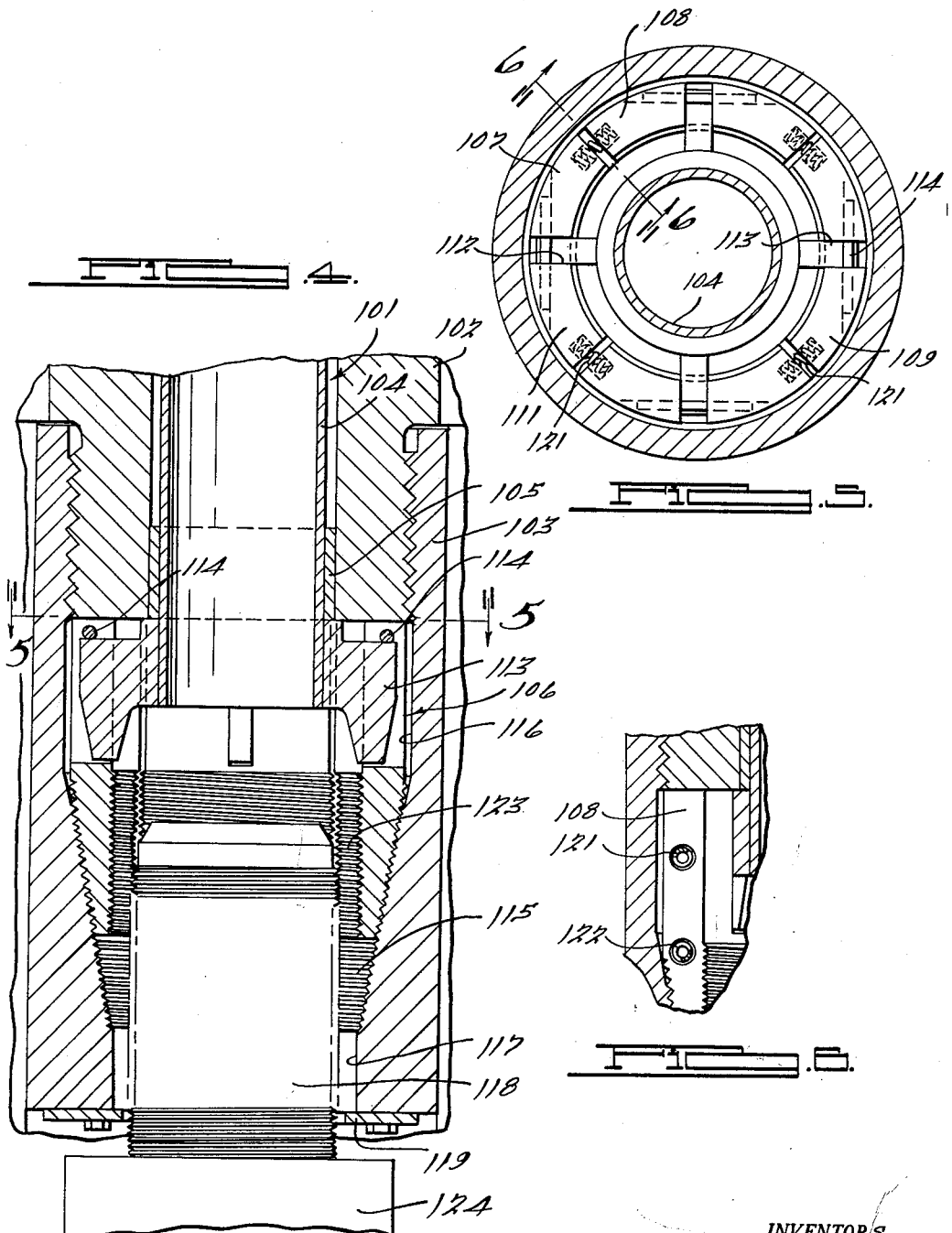

United States Patent Office 3,128,990
Patented Apr. 14, 1964

3,128,990
SELF-ALIGNING CONNECTOR FOR STUD
TENSIONERS
Ernest A. Brooks, Hudson, and LeRoy S. DeMart, Lancaster, Ohio, assignors to Diamond Power Specialty Corporation, Lancaster, Ohio, a corporation of Ohio
Filed May 8, 1961, Ser. No. 108,612
12 Claims. (Cl. 254—29)

This invention relates to stud tensioners, and more particularly to means for connecting such tensioners to a stud in a rapid and efficient manner.

It is an object of the invention to provide a novel and improved connector between a stud tensioner and stud which will reduce the possibility of galling or otherwise damaging the stud threads when the tensioner is being mounted thereon.

It is another object to provide a novel and improved stud tensioner connector of this type which facilitates alignment of the threaded portion of the connector with the stud threads without interfering with the positioning of the pedestal, motor and other portions of the tensioner.

Other objects, features, and advantages of the present invention will become apparent from the subsequent description, taken in conjunction with the accompanying drawings.

In the drawings:

FIGURE 2 is a fragmentary cross-sectional plan view taken along the line 2—2 of FIGURE 1 and showing the universal joint between the driving tube and nut of the connector;

FIGURE 3 is a view similar to the lower portion of FIGURE 1 but showing the connector in its initial position engaging the upper end of the stud threads, while the drawbar is in its lowered position;

FIGURE 4 is a cross-sectional view in elevation of another embodiment of the invention in which the connector nut is of segmented construction;

FIGURE 5 is a plan cross-sectional view taken along line 5—5 of FIGURE 4 and showing the springs between the segments; and FIGURE 6 is a fragmentary cross-sectional view in elevation taken along the line 6—6 of FIGURE 5 and showing the locations of the two springs between each pair of adjacent segments.

Figure 1:
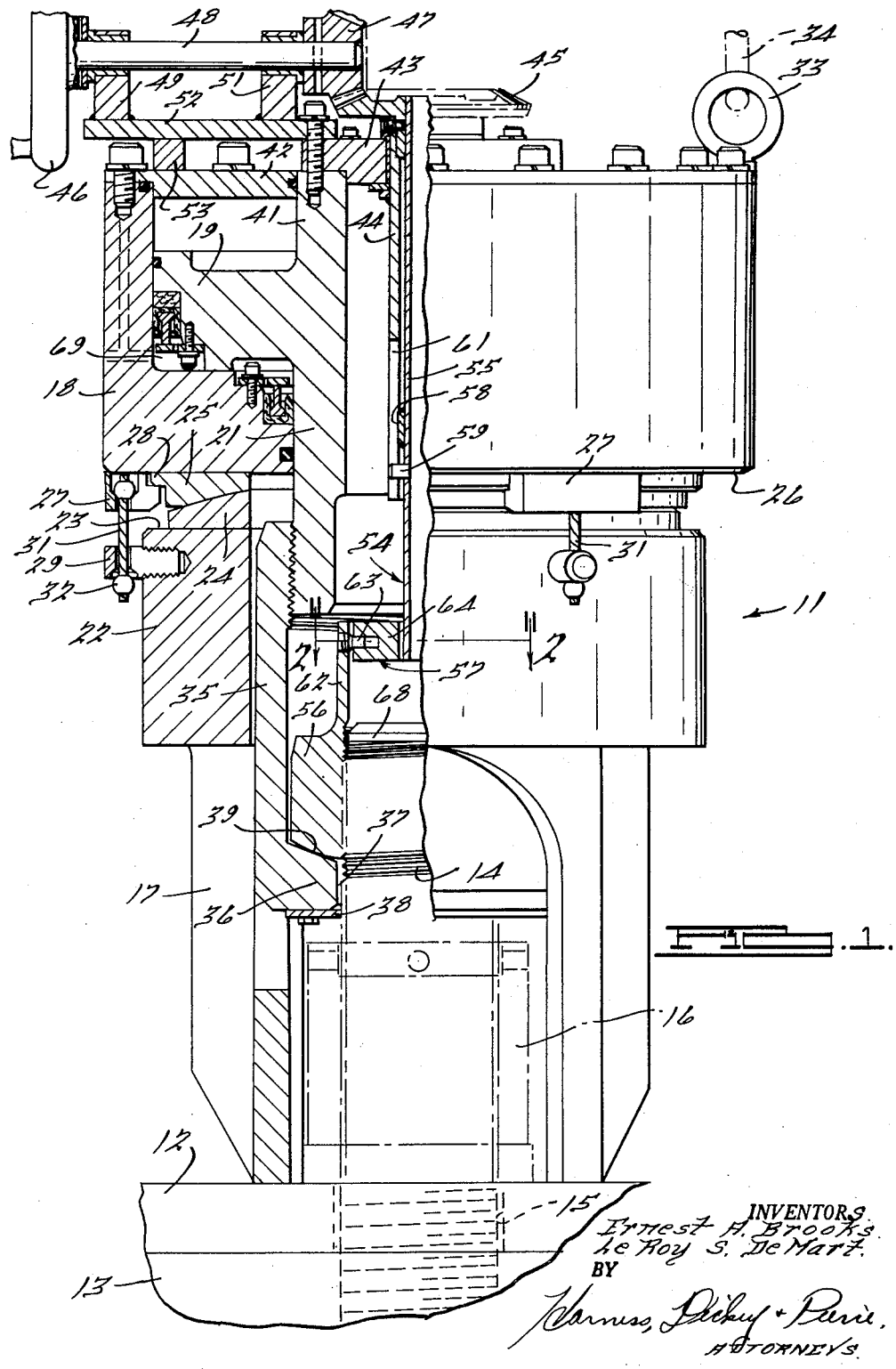
FIGURE 1 is a side elevational view, partially in cross section, of a stud tensioner incorporating one embodiment of the self-aligning connector of this invention, the tensioner being mounted on a vessel with the connector in fully threaded position on the stud.

In general terms, the invention comprises a connector for temporarily securing the drawbar of a stud tensioner to the stud threads in such manner that at most only components of relatively light weight engage the top of the stud threads as the tensioner is lowered over the stud, and the connector may be easily attached to the stud threads by rotative movement after the drawbar and other tensioner components have been lowered into place.

In one illustrated embodiment of the invention, a stud tensioner is shown having a hollow drawbar extending downwardly from the motor piston, and the connector comprises an upper drive portion of tubular shape and a lower threaded portion or nut, these portions being connected by means permitting limited rocking movement in any direction. Means are provided on the top of the tensioner for rotating the drive portion of the connector. The lower end of the hollow drawbar has an inwardly extending surface which is engageable with the undersurface of the connector nut to exert a stud tensioning force thereon. In this illustrated embodiment, the tensioner, including the drawbar, will first be lowered over the stud, the connector lightly engaging the upper end of the stud thread until the other parts of the stud tensioner have come to rest. The connector may then be manually rotated into full engagement with the stud.

In another illustrated embodiment of the invention, the nut or threaded portion of the connector is made up of four circularly arranged segments, and these segments have external threads engageable with a downwardly tapered internal thread at the lower end of the drawbar. In this embodiment, after the drawbar has been lowered over the stud, the connector nut will be threaded downwardly within the tapered drawbar thread, forcing the segments inwardly against the stud threads.

Referring more particularly to the drawings, a stud tensioner generally indicated at 11 is shown in FIGURE 1, the tensioner being mountable on a cover 12 of a vessel 13 having a plurality of studs 14 extending upwardly through apertures 15 in the vessel. Nuts 16 are threadably mounted on studs 14, the purpose of the stud tensioner being to pre-tension each stud so that its nut 16 may be hand tightened, thus assuring equal tension in all the vessel studs.

Stud tensioner 11 comprises a pedestal 17 having a plurality of legs adapted to surround each stud and rest on the top of cover 12, a cylinder 18 disposed above pedestal 17, and a piston 19 slidably disposed within the cylinder and having a piston rod 21 extending downwardly through the lower cylinder wall. The upper hollow portion 22 of pedestal 17 has a flat upper surface 23, and a spherical bearing comprising a lower element 24 and an upper element 25 is disposed between surface 23 and the undersurface 26 of cylinder 18. Lower element 24 of the spherical bearing is secured to pedestal portion 22, upper element 25 being supported for limited sliding movement by means of a plurality of spaced brackets 27 attached to the underside of cylinder 18 and having inward projections disposed beneath an outwardly directed flange 28 on element 25. Space for lateral sliding movement is provided by the brackets, as seen in FIGURE 1, so that the upper element may adjust itself with respect to the lower element when the stud tensioner is being lowered onto a stud. This construction is described in more detail in copending application Serial No. 116,031, filed June 9, 1961 by LeRoy S. De Mart and assigned to the assignee of the present application.

A plurality of outwardly extending brackets 29 are provided on the upper portion 22 of pedestal 17, and flexible links 31 extend between brackets 27 and 29 and are retained by virtue of enlarged portions 32 at the ends of the flexible links. The lengths of these links is such as to permit separation of the spherical washer elements when the stud tensioner is lifted. A plurality of eyes 33 are secured in spaced relation to the top of cylinder 18 so that a crane (one hook of which is shown partially in dot-dash lines at 34 in FIGURE 1) may lift the stud tensioner for transport from stud to stud.

The lower end of hollow piston rod 21 is externally threaded, and a drawbar 35 of generally tubular shape is threadably mounted thereon and extends downwardly into the hollow center of pedestal 17. An inwardly directed shoulder 36 is formed at the lower end of drawbar 35, this shoulder having an inside diameter 37 slightly larger than the major thread diameter of the stud threads. An annular plate 38 having a slightly smaller inside diameter than that of surface 37 is secured to the undersurface of drawbar 35, this plate being fabricated of aluminum or other relatively soft metal and acting as a guard plate to prevent damage to the stud threads when the drawbar is being lowered over the stud.

The upper surface 39 of drawbar shoulder 36 is of upwardly flaring frustoconical shape for engagement with the connector as later described. Preferably, the angle of this surface is approximately the same as the angle of static friction of the materials in engagement, so that when upward force is exerted by drawbar 35 on the connector, wedging as well as bending forces on the drawbar will be minimized. Piston 19 has a hollow upward extension 41 which extends through a cover plate 42 on the top of the cylinder and has a circular bearing plate 43 centrally secured thereto. A connector guide sleeve 44 is rotatably mounted in bearing plate 43 and has a bevel gear 45 secured to the upper end thereof. A hand wheel 46 secured to a bevel pinion 47 by a shaft 48 is adapted to rotate bevel gear 45, shaft 48 being rotatably mounted in bearings 49 and 51 which are mounted on a supporting plate 52 secured to bearing plate 43, a leg 53 being secured to the underside of plate 52 for engagement with cover 42 when the piston is in its lower position.

The self-aligning connector is generally indicated at 54 and comprises a driving tube 55 slidably but non-rotatably mounted within guide sleeve 44, a lower threaded portion or nut 56, and a universal joint generally indicated at 57 connecting the lower end of tube 55 with the upper end of nut 56. The upper end of tube 55 is slidably disposed within the hub of gear 45, and the tube carries elements 58 at its intermediate portion for sliding engagement with the interior of sleeve 44. A pin 59 is secured to an intermediate portion of tube 55 and is slidably mounted in a slot 61 in the lower end of sleeve 44, the pin and slot serving as a rotary driving connection between the sleeve and tube.

Nut 56 of connector 54 is of hollow shape, having a relatively thick internally threaded lower portion and a relatively thin upper portion 62. Universal joint 57 is of a gimbal type as seen in FIGURE 2 and comprises a pair of inwardly extending pins 63 secured to section 62 of threaded portion 56, an intermediate member 64 pivotally mounted on these pins, and a pair of pins 65 on an axis at right angles to the axis of pins 63, pins 65 being carried by member 64 and extending inwardly so as to pivotally connect the lower end of tube 55 to member 64. The universal joint will thus permit nut 56 of the connector to have limited rocking movement in any direction with respect to tube 55.

As best seen in FIGURE 3, the annular lower surface 66 of connector nut 56 is of slightly convex shape, with a slope complementary to that of frustoconical surface 39, so that relative angular adjustment between connector nut 56 and drawbar 35 will be permitted. The threads of connector nut 56 match those of stud 14, and the lower end of the threads is provided with an outwardly flaring annular surface 67 engageable with the upper end of the stud threads. Preferably, a short portion 68 of lesser diameter than the stud thread is provided at the top of the stud.

In operation, stud tensioner 11 will be lowered by hooks 34 over a stud 14 which it is desired to tension, until pedestal 17 comes to rest on cover 12. Piston 19 may be in its lowered position as seen in FIGURE 1, and as the stud tensioner is lowered over the stud, the parts will be guided so that surface 67 of connector nut 56 passes over upper stud portion 68 and comes to rest on the upper end of the stud threads, as seen in FIGURE 3.

The stud tensioner will then continue to be lowered and as this is done, guard plate 38 and drawbar 35 will be lowered, together with all the remaining portions of the stud tensioner except connector 54 until the drawbar is in the position as shown in FIGURE 3. It will thus be seen that only elements of relatively light weight, namely, the components of connector 54, will initially engage the top of the stud threads, thus minimizing the possibility of thread damage. The connector will also serve to center the other parts of the stud tensioner with respect to the stud while the stud tensioner is being lowered.

When the pedestal is in full engagement with vessel cover 12 and cylinder 18 rests on the pedestal by means of spherical bearing elements 24 and 25, nut 56 of the connector may be threaded onto the stud by rotation of hand wheel 46. This rotation will cause rotation of sleeve 44 and therefore of tube 55 through pin 59 and slot 61. Tube 55 will cause rotation of nut 56 through universal joint 57, the universal joint permitting the nut to adjust itself angularly in accordance with the requirements of proper thread engagement.

When the parts are in the position of FIGURE 3, the upper end of sleeve 55 will project a substantial distance above the hub of gear 45, but as nut 56 is threaded onto the stud, sleeve 55 will be lowered. When nut 56 is fully threaded onto the stud, the top of sleeve 55 will be substantially flush with the top of the hub of gear 45. Undersurface 66 of nut 56 will then be in engagement with drawbar surface 39.

Fluid pressure may then be applied to the lower chamber 69 of cylinder 18, pulling drawbar 35 upwardly. The force exerted by the drawbar on the underside of nut 56 will be transmitted directly to stud 14, tensioning the stud. Convexly arcuate surface 66 on the underside of nut 56 will permit any necessary slight angular adjustment between the nut and drawbar as the force is increased. When the proper tension has been attained, stud nut 16 may be hand-tightened and the fluid pressure in chamber 69 relieved. Hand wheel 46 may then be rotated in the opposite direction so as to unthread nut 56 from stud 14. The stud tensioner may then be lifted by means of hooks 34, drawbar 35 rising until it engages nut 56 and lifts it gently away from the stud.

The same basic operation may be carried out when it is desired to tension stud 14 in order to loosen its nut 16. Since after loosening nut 16 and relieving the pressure in chamber 69, stud 14 will shrink to a lesser height than its height when nut 56 was first threaded thereon, precautions should be taken to insure that piston 19 will not bottom in cylinder 18 before stud 14 has been permitted to reach its fully relaxed condition. Otherwise, nut 56 could be pulled down into tight engagement with surface 39 of drawbar 35, and it would then be difficult to unscrew nut 56 from the stud.

FIGURES 4, 5 and 6 show another embodiment of the self-aligning connector, generally indicated at 101 in these figures. The stud tensioner in this case is shown as having a downwardly extending piston rod 102 from a piston (not shown) similar to that shown in FIGURE 1. The lower end of piston rod 102 is externally threaded, and an internally threaded drawbar 103 is mounted thereon and extends downwardly therefrom.

Connector 101 comprises a driving tube 104 having an upper end (not shown) with a slidable and non-rotatable connection to guide sleeve 44 shown in FIGURE 1, or to a similar member. A bearing 105 is disposed within the lower end of piston rod 102 and rotatably supports tube 104. The nut of connector 101 is generally indicated at 106 and comprises four circularly arranged segments of identical shape, these segments being indicated at 107, 108, 109 and 111 in FIGURE 5. Each nut segment forms an arc of about 90° and has a central downwardly extending slot 112 formed in the upper end thereof. A spider 113 having four outward projections spaced 90° apart is mounted on the lower end of tube 104, and these projections are loosely disposed within slots 112. Retaining pins 114 extend across the upper ends of slots 112 to hold spider 113 in position, but permitting limited rocking movement of any nut segment with respect to spider 113 about an axis parallel to pin 114 of that segment.

The lower portion of drawbar 103 has a downwardly and inwardly tapered internal thread 115, the upper end of this thread being connected with a hollow space 116 within drawbar 103 which is of somewhat larger diameter than that of spider 113. The lower end of thread 115 is connected with a cylindrical bore 117 in the lower end of drawbar 103 of somewhat larger diameter than that of stud 118 which is to be tensioned. A guard plate 119 of relatively soft metal may be secured to the underside of drawbar 103.

The lower portion of each segment 107 to 111 has an external thread complementary to thread 115 so that the segments may fit as an expandable nut within the drawbar. Two helical compression springs 121 and 122 are disposed between adjacent segments, these springs being disposed within retaining apertures in the parallel facing side walls of the segments and urging the segments into expanded relation. Internal threads 123 are formed on the segments, these threads being complementary to the threads on stud 118, so that as nut 106 is forced downwardly within drawbar 103 by rotating the nut, the contracting nut segments will engage the threads of stud 118.

In operation of a stud tensioner including a connector of the type shown in FIGURES 4 to 6, the tensioner will be lowered over the stud as in the previous embodiment, nut 106 being in a raised position as shown in FIGURE 4. Unlike the previous embodiment, there will be no engagement of any connector components with the stud as the tensioner is being lowered. After the stud tensioner has been fully lowered, tube 104 and nut 106 will be rotated so as to force nut 106 downwardly into tapered thread 115. When the nut reaches its lowered position, its internal threads 123 will become engaged with the threads of stud 118. Upward force exerted on piston rod 102 will thus be transmitted through drawbar 103 and nut 106 to stud 118. After the full tension has been attained and nut 124 of stud 118 hand tightened, the upward force on piston rod 102 may be relaxed and tube 104 turned in the opposite direction to release nut 106 from the stud. The stud tensioner may then be lifted away from the stud.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination, a stud tensioner having a pedestal and a reciprocable motor disposed above said pedestal and supportable thereby, a drawbar connected to said motor and extending downwardly within said pedestal, the lower portion of said drawbar being of annular shape with an internal diameter sufficiently large to permit the drawbar to be freely lowered over a stud, a connector having a nut disposed within said drawbar and movable axially with respect thereto, an internal thread on said nut complementary to the stud thread, facing surfaces on said nut and drawbar responsive to an upward force exerted on said drawbar when said surfaces are in engagement to cause an upward force to be exerted on said stud, means for moving said nut with respect to said drawbar between an upper position in which said nut threads are disengaged from said stud and a lower position in which said nut threads are engaged with said stud, and a driving member extending upwardly from said nut and non-rotatably secured thereto, said means for moving said nut including means for rotating said driving member.

2. In combination, a stud tensioner having a pedestal and a reciprocable motor disposed above said pedestal and supportable thereby, a drawbar connected to said motor and extending downwardly within said pedestal, the lower portion of said drawbar being of annular shape with an internal diameter sufficiently large to permit the drawbar to be freely lowered over a stud, a connector having a nut disposed within said drawbar and movable axially with respect thereto, an internal thread on said nut complementary to the stud thread, facing surfaces on said nut and drawbar responsive to an upward force exerted on said drawbar when said surfaces are in engagement to cause an upward force to be exerted on said stud, means for moving said nut with respect to said drawbar between an upper position in which said nut threads are disengaged from said stud and a lower position in which said nut threads are engaged with said stud, a driving member extending upwardly from said nut and non-rotatably secured thereto, said means for moving said nut including means for rotating said driving member, and a limited rocking connection between said nut and driving member.

3. The combination according to claim 2, said driving member comprising a tube, a guide sleeve rotatably mounted in the upper end of said stud tensioner and surrounding said tube, means slidably but non-rotatably connecting said tube and sleeve, and means for rotating said sleeve in either direction.

4. In combination with a stud tensioner of the type having a pedestal and reciprocable motor supported thereby, a drawbar connected to said motor and having a hollow lower end adapted to surround a stud in non-engaging relation therewith, a connector having a nut with an internal thread matching the thread of said stud, said nut being disposed within said drawbar, the nut being movable in an axial direction relative to said drawbar between a first position in which said nut is effectively disengaged from said stud threads and said drawbar surrounds said stud, and a second position in which said nut effectively engages the threads of said stud and said drawbar is in the same position relative to said stud as said first position, coacting surfaces on said nut and drawbar responsive to an upward force exerted on the drawbar when the nut and drawbar are in their second position to cause an upward force to be exerted on said stud, and means for rotating said nut to move said nut from its first position to its second position relative to said drawbar.

5. In combination with a stud tensioner of the type having a pedestal and a motor supported thereabove, a hollow drawbar connected to and extending downwardly from said motor within said pedestal, an inwardly directed shoulder at the lower end of said drawbar, the inner diameter of said shoulder being sufficiently large to permit the drawbar to be lowered in non-engaging relation with the stud threads, a connector comprising a nut disposed within said drawbar above said shoulder, a surface on the underside of said nut engageable by said shoulder, a thread on said nut cooperable with the threads of a stud to be tensioned, means permitting relative vertical movement between said nut and said drawbar, said nut and drawbar having a first position in which said drawbar surrounds said stud and the lower end of said nut threads engage the upper end of stud threads, and means for rotating said nut to a second position in which said nut is threaded onto said stud and said nut and drawbar surfaces are in coacting relation.

6. In combination with a stud tensioner of the type having a pedestal and a motor supported thereabove, a hollow drawbar connected to and extending downwardly from said motor within said pedestal, an inwardly directed shoulder at the lower end of said drawbar, the inner diameter of said shoulder being sufficiently large to permit the drawbar to be lowered in non-engaging relation with the stud threads, a connector comprising a nut disposed within said drawbar above said shoulder, a surface on the underside of said nut engageable by said shoulder, a thread on said nut cooperable with the threads of a stud to be tensioned, means permitting relative vertical movement between said nut and said drawbar, said nut and drawbar having a first position in which said drawbar surrounds said stud and the lower end of said nut threads engage the upper end of stud threads, and means for rotating said nut to a second position in which said nut is threaded onto said stud and said nut and drawbar surfaces are in coacting relation, the upper surface of said drawbar shoulder having a frustoconical surface, said nut underside surface being of slightly convex arcuate shape and engageable with said frustoconical surface.

7. The combination according to claim 6, said frustoconical surface having an angle approximately equal to the angle of static friction of the materials from which the coacting nut and drawbar surfaces are formed.

8. In combination with a stud tensioner of the type having a pedestal and a motor supported thereabove, a drawbar connected to said motor and extending therebelow, the inner diameter of said drawbar being sufficient to permit the drawbar to be lowered over a stud in non-engaging relation therewith, an upwardly flaring internal thread in said drawbar, a connector having a segmented nut with an internal thread matching the thread of a stud to be tensioned and an external thread engageable with said drawbar thread, a slot in tthe upper portion of each segment of said segmented nut, a driving tube for said connector extending upwardly from said nut, a spider secured to the lower end of said tube and having legs disposed within said segment slots, retaining pins extending across said slots above said spider, and springs between adjacent segments urging the segments into expanded relation, said nut being rotatable by said tube when said drawbar is disposed around said stud between an upper position in which the nut is separated from said stud to a lower position in which said nut engages said stud.

9. In combination with a stud tensioner of the type having a pedestal and reciprocable motor supported thereby, a drawbar connected to said motor and having a hollow lower end adapted to surround a stud in non-engaging relation therewith, a connector having a nut with an internal thread matching the thread of said stud, said nut being disposed within said drawbar, the nut being movable in an axial direction relative to said drawbar between a first position in which said nut is effectively disengaged from said stud threads and said drawbar surrounds said stud, and a second position in which said nut effectively engages the threads of said stud and said drawbar is in the same position relative to said stud as said first position, coacting surfaces on said nut and drawbar responsive to an upward force exerted on the drawbar when the nut and drawbar are in their second position to cause an upward force to be exerted on said stud, means on said connector for rotating said nut to move said nut from its first position to its second position relative to said drawbar, said last-mentioned means, including a driving tube extending upwardly from said nut, and a connection between said nut and tube permitting limited rocking movement of said nut with respect to said tube.

10. In combination with a stud tensioner of the type having a pedestal and a motor supported thereabove, a hollow drawbar connected to and extending downwardly from said motor within said pedestal, an inwardly directed shoulder at the lower end of said drawbar, the inner diameter of said shoulder being sufficiently large to permit the drawbar to be lowered in non-engaging relation with the stud threads, a connector comprising a nut disposed within said drawbar above said shoulder, a surface on the underside of said nut engageable by said shoulder, a thread on said nut cooperable with the threads of a stud to be tensioned, means permitting relative vertical movement between said nut and said drawbar, said nut and drawbar having a first position in which said drawbar surrounds said stud and the lower end of said nut threads engage the upper end of stud threads, means for rotating said nut to a second position in which said nut is threaded onto said stud and said nut and drawbar surfaces are in coacting relation, said last-mentioned means comprising an upwardly extending tube, and a universal joint between said tube and said nut.

11. In combination with a stud tensioner of the type having a pedestal and a motor supported thereabove, a hollow drawbar connected to and extending downwardly from said motor within said pedestal, an inwardly directed shoulder at the lower end of said drawbar, the inner diameter of said shoulder being sufficiently large to permit the drawbar to be lowered in non-engaging relation with the stud threads, a connector comprising a nut disposed within said drawbar above said shoulder, a surface on the underside of said nut engageable by said shoulder, a thread on said nut cooperable with the threads of a stud to be tensioned, means permitting relative vertical movement between said nut and said drawbar, said nut and drawbar having a first position in which said drawbar surrounds said stud and the lower end of said nut threads engage the upper end of stud threads, means for rotating said nut to a second position in which said nut is threaded onto said stud and said nut and drawbar surfaces are in coacting relation, and an annular guard plate of relatively soft metal secured to the underside of said drawbar, the drawbar having a stud-receiving recess above said plate with a diameter slightly larger than the inside plate diameter.

12. In combination with a stud tensioner of the type having a pedestal and a motor supported thereabove, a drawbar connected to said motor and having an upwardly extending central recess in the lower end thereof of greater diameter than a stud to be tensioned, an upwardly flaring cavity within said drawbar, a segmented nut vertically movable within said cavity between an upper expanded position and a lower stud-engaging position, the interior thread on said segmented nut matching the thread of said stud, means for moving said nut between its upper and lower positions within said drawbar comprising a rotatable member, a non-rotatable connection between said rotatable member and each segment of the segmented nut, said upwardly flaring drawbar cavity being internally threaded, and external threads on said segmented nut engageable with said drawbar threads.

References Cited in the file of this patent
UNITED STATES PATENTS

| | | |
|---|---|---|
| 2,756,019 | Von Heidenstam et al. | July 24, 1956 |
| 2,885,919 | Carlson | May 12, 1959 |
| 3,008,362 | Tucker | Nov. 14, 1961 |